US011441826B2

(12) United States Patent
Schreiber et al.

(10) Patent No.: US 11,441,826 B2
(45) Date of Patent: Sep. 13, 2022

(54) CONDENSER WITH EXTERNAL SUBCOOLER

(71) Applicant: Johnson Controls Technology Company, Auburn Hills, MI (US)

(72) Inventors: Jeb W. Schreiber, Stewartstown, PA (US); Eric H. Albrecht, Dallastown, PA (US); Kevin D. Krebs, Dallastown, PA (US); Justin P. Kauffman, York, PA (US); Brian L. Stauffer, York, PA (US); Xiuping Su, Wuxi (CN); Li Wang, Wuxi (CN); Fang Xue, Wuxi (CN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/225,819

(22) Filed: Apr. 8, 2021

(65) Prior Publication Data

US 2021/0222925 A1     Jul. 22, 2021

Related U.S. Application Data

(63) Continuation of application No. 15/385,672, filed on Dec. 20, 2016, now abandoned.
(Continued)

(51) Int. Cl.
*F25B 40/02* (2006.01)
*F25B 39/04* (2006.01)
(Continued)

(52) U.S. Cl.
CPC .............. *F25B 40/02* (2013.01); *F25B 39/04* (2013.01); *F28D 3/02* (2013.01); *F28D 3/04* (2013.01);
(Continued)

(58) Field of Classification Search
CPC ........ F25B 40/02; F25B 39/04; F25B 25/005; F25B 2339/047; F25B 2400/13;
(Continued)

(56) References Cited

U.S. PATENT DOCUMENTS

| 1,233,138 A | 7/1917 | Snow |
| 3,020,024 A | 2/1962 | Lawrance |

(Continued)

FOREIGN PATENT DOCUMENTS

| CN | 2236637 | 10/1996 |
| CN | 2286303 | 7/1998 |

(Continued)

OTHER PUBLICATIONS

Chinese Office Action for CN Application No. 201680073025.1 dated Aug. 24, 2020, 6 pg.
(Continued)

*Primary Examiner* — Lionel Nouketcha
(74) *Attorney, Agent, or Firm* — Fletcher Yoder, P.C.

(57) ABSTRACT

Embodiments of the present disclosure relate to a vapor compression system that includes a refrigerant loop, a compressor disposed along the refrigerant loop and configured to circulate refrigerant through the refrigerant loop, a condenser disposed downstream of the compressor along the refrigerant loop and configured to condense vapor refrigerant to liquid refrigerant, a subcooler coupled to the condenser, where the subcooler is external of a shell of the condenser, and where the subcooler is configured to receive the liquid refrigerant from the condenser and to cool the liquid refrigerant to subcooled refrigerant, and an evaporator disposed downstream of the subcooler along the refrigerant loop and configured to evaporate the subcooled refrigerant to the vapor refrigerant.

16 Claims, 11 Drawing Sheets

Related U.S. Application Data

(60) Provisional application No. 62/270,164, filed on Dec. 21, 2015.

(51) Int. Cl.

| | | |
|---|---|---|
| *F28D 7/16* | (2006.01) | |
| *F28D 5/02* | (2006.01) | |
| *F28D 3/02* | (2006.01) | |
| *F28D 3/04* | (2006.01) | |
| *F28F 9/02* | (2006.01) | |
| *F25B 25/00* | (2006.01) | |
| *F28D 21/00* | (2006.01) | |
| *F25B 41/39* | (2021.01) | |

(52) U.S. Cl.
CPC ............... *F28D 5/02* (2013.01); *F28D 7/16* (2013.01); *F28D 7/163* (2013.01); *F28D 7/1607* (2013.01); *F28F 9/026* (2013.01); *F25B 25/005* (2013.01); *F25B 41/39* (2021.01); *F25B 2339/046* (2013.01); *F25B 2339/047* (2013.01); *F25B 2400/13* (2013.01); *F25B 2400/23* (2013.01); *F25B 2600/0253* (2013.01); *F28D 2021/0068* (2013.01); *Y02B 30/70* (2013.01)

(58) Field of Classification Search
CPC ..... F25B 6/04; F28D 3/02; F28D 3/04; F28D 5/02; F28D 7/1607
See application file for complete search history.

(56) References Cited

U.S. PATENT DOCUMENTS

| | | | | |
|---|---|---|---|---|
| 3,365,899 | A | | 1/1968 | Eta |
| 3,534,565 | A | | 10/1970 | Osborne |
| 3,553,974 | A | * | 1/1971 | Osborne ............... F25B 49/02 62/149 |
| 4,208,529 | A | | 6/1980 | Murray |
| 4,252,186 | A | | 2/1981 | Starner et al. |
| 4,437,322 | A | * | 3/1984 | Ertinger ............... B23P 15/26 62/115 |
| 4,494,386 | A | | 1/1985 | Edwards et al. |
| 4,972,683 | A | * | 11/1990 | Beatenbough .......... F25B 39/04 165/110 |
| 5,212,965 | A | | 5/1993 | Datta |
| 5,509,466 | A | | 4/1996 | McQuade et al. |
| 5,996,356 | A | | 12/1999 | Kishimoto et al. |
| 7,073,567 | B2 | * | 7/2006 | Berchowitz ............ F25B 39/02 165/175 |
| 2010/0006264 | A1 | | 1/2010 | Jadric et al. |
| 2010/0275643 | A1 | * | 11/2010 | Welch .................... F25B 40/02 62/498 |
| 2013/0277020 | A1 | | 10/2013 | Numata et al. |
| 2015/0007604 | A1 | | 1/2015 | Hu et al. |
| 2015/0247658 | A1 | | 9/2015 | Cosby, II et al. |

FOREIGN PATENT DOCUMENTS

| | | |
|---|---|---|
| CN | 2735254 | 10/2005 |
| CN | 1847768 | 10/2006 |
| CN | 201897348 | 7/2011 |
| CN | 201926338 | 8/2011 |
| CN | 102261772 | 11/2011 |
| CN | 202928174 | 5/2013 |
| CN | 102597680 | 6/2014 |
| CN | 105135914 | 12/2015 |
| JP | S5573176 | 5/1980 |
| JP | S61256194 | 11/1986 |
| JP | S63259363 | 10/1988 |
| JP | H04116358 | 4/1992 |
| JP | H08233408 | 9/1996 |
| JP | H10132400 | 5/1998 |
| JP | H10246595 | 9/1998 |
| JP | 2000274881 | 10/2000 |
| JP | 2003065631 | 3/2003 |
| JP | 2008298413 | 12/2008 |
| JP | 2012533284 | 12/2012 |
| WO | 2009089100 | 7/2009 |

OTHER PUBLICATIONS

Taiwan Office Action and Search Report for TW Application No. 105142498, dated Jul. 7, 2020, 11 pgs.
Taiwan Office Action for TW Application No. 105142497, dated Jul. 9, 2020, 3 pgs.
Japanese Notice of Allowance for JP Application No. 2018-551911 dated Dec. 3, 2019, 3 pg.
Korean Office Action for KR Application No. 10-2018-7019997 dated Nov. 19, 2019, 8 pg.
Chinese Office Action for CN Application No. 201680073025.1 dated Dec. 4, 2019, 15 pg.
Taiwan Office Action and Search Report for TW Application No. 105142497 dated Mar. 10, 2020, 9 pgs.
Korean Office Action for KR Application No. 10-2018-7019997 dated May 19, 2020, 2 pgs.
PCT International Search Report & Written Opinion for PCT Application No. PCT/US2016/068124 dated Mar. 7, 2017, 12 pgs.
PCT International Search Report & Written Opinion for PCT Application No. PCT/US2016/068106 dated Mar. 10, 2017, 14 pgs.

* cited by examiner

CONDENSER WITH EXTERNAL SUBCOOLER

CROSS REFERENCE TO RELATED APPLICATIONS

This is a continuation application of U.S. patent application Ser. No. 15/385,672, entitled "CONDENSER WITH EXTERNAL SUBCOOLER," filed Dec. 12, 2016, which claims priority from and the benefit of U.S. Provisional Application Ser. No. 62/270,164, filed Dec. 21, 2015, entitled "VAPOR COMPRESSION SYSTEM," Chinese Patent Application No. 201521134920.9, filed Dec. 31, 2015, entitled "SHELL AND TUBE CONDENSER WITH EXTERNAL SUBCOOLER," and Chinese Patent Application No. 201521138170.2, filed Dec. 31, 2015, entitled "SHELL AND TUBE CONDENSER WITH EXTERNAL SUBCOOLER," each of which is hereby incorporated by reference in its entirety for all purposes.

BACKGROUND

This application relates generally to vapor compression systems incorporated in air conditioning and refrigeration applications.

Vapor compression systems utilize a working fluid, typically referred to as a refrigerant that changes phases between vapor, liquid, and combinations thereof in response to being subjected to different temperatures and pressures associated with operation of the vapor compression system. Refrigerants are desired that are friendly to the environment, yet have a coefficient of performance (COP) that is comparable to traditional refrigerants. COP is a ratio of heating or cooling provided to electrical energy consumed, and higher COPs equate to lower operating costs. Unfortunately, there are challenges associated with designing vapor compression system components compatible with environmentally-friendly refrigerants, and more specifically, vapor compression system components that operate to maximize efficiency using such refrigerants.

SUMMARY

In an embodiment of the present disclosure, a vapor compression system includes a refrigerant loop, a compressor disposed along the refrigerant loop and configured to circulate refrigerant through the refrigerant loop, a condenser disposed downstream of the compressor along the refrigerant loop and configured to condense vapor refrigerant to liquid refrigerant, a subcooler coupled to the condenser, where the subcooler is external of a shell of the condenser, and where the subcooler is configured to receive the liquid refrigerant from the condenser and to cool the liquid refrigerant to subcooled refrigerant, and an evaporator disposed downstream of the subcooler along the refrigerant loop and configured to evaporate the subcooled refrigerant to the vapor refrigerant.

In another embodiment of the present disclosure, a subcooler includes a shell, a plurality of tubes, where the plurality of tubes are disposed within the shell, and an inlet disposed on the shell and configured to direct condensed refrigerant from a condenser into the subcooler, and where the subcooler is coupled to an outer shell of the condenser.

In another embodiment of the present disclosure, a vapor compression system includes a refrigerant loop, a compressor disposed along the refrigerant loop and configured to circulate refrigerant through the refrigerant loop, a condenser disposed downstream of the compressor along the refrigerant loop, where the condenser includes a shell and a first plurality of tubes disposed in the shell, where the first plurality of tubes is configured to flow a first cooling fluid, and where the first cooling fluid is configured to be in a heat exchange relationship with the refrigerant, a subcooler coupled directly to an outer surface of the shell of the condenser or coupled indirectly to the outer surface of the shell of the condenser, where the subcooler includes a subcooler shell and a second plurality of tubes configured to flow a second cooling fluid, and where the second cooling fluid is configured to be in a heat exchange relationship with the refrigerant, and an evaporator disposed downstream of the subcooler along the refrigerant loop.

DETAILED DESCRIPTION

Embodiments of the present disclosure are directed towards a condenser of a vapor compression system that includes an external subcooler. Typically, the subcooler is positioned within a shell of the condenser. Unfortunately, a relatively large level of refrigerant may be present in the condenser when the subcooler is included within the condenser to ensure that the subcooler sufficiently cools the refrigerant. Additionally, a size of the condenser may be increased to accommodate an additional volume consumed by the subcooler. Further, manufacturing the condenser to include the subcooler within the shell may be relatively complex, time-consuming, and expensive. Therefore, embodiments of the present disclosure are directed to a condenser that includes a subcooler positioned external to the condenser shell. Positioning the subcooler external to the shell of the condenser may enable the condenser to include a reduced level of refrigerant, while providing substantially the same amount of subcooling to the refrigerant. Additionally, a size of the condenser may be reduced while including the same amount of tubes because the subcooler is positioned external to the shell of the condenser. Reducing the size of the condenser may reduce costs and a footprint of the overall vapor compression system. Further, positioning the subcooler external to the subcooler shell may simplify manufacturing, which may also lead to reduced costs.

Figure 1:
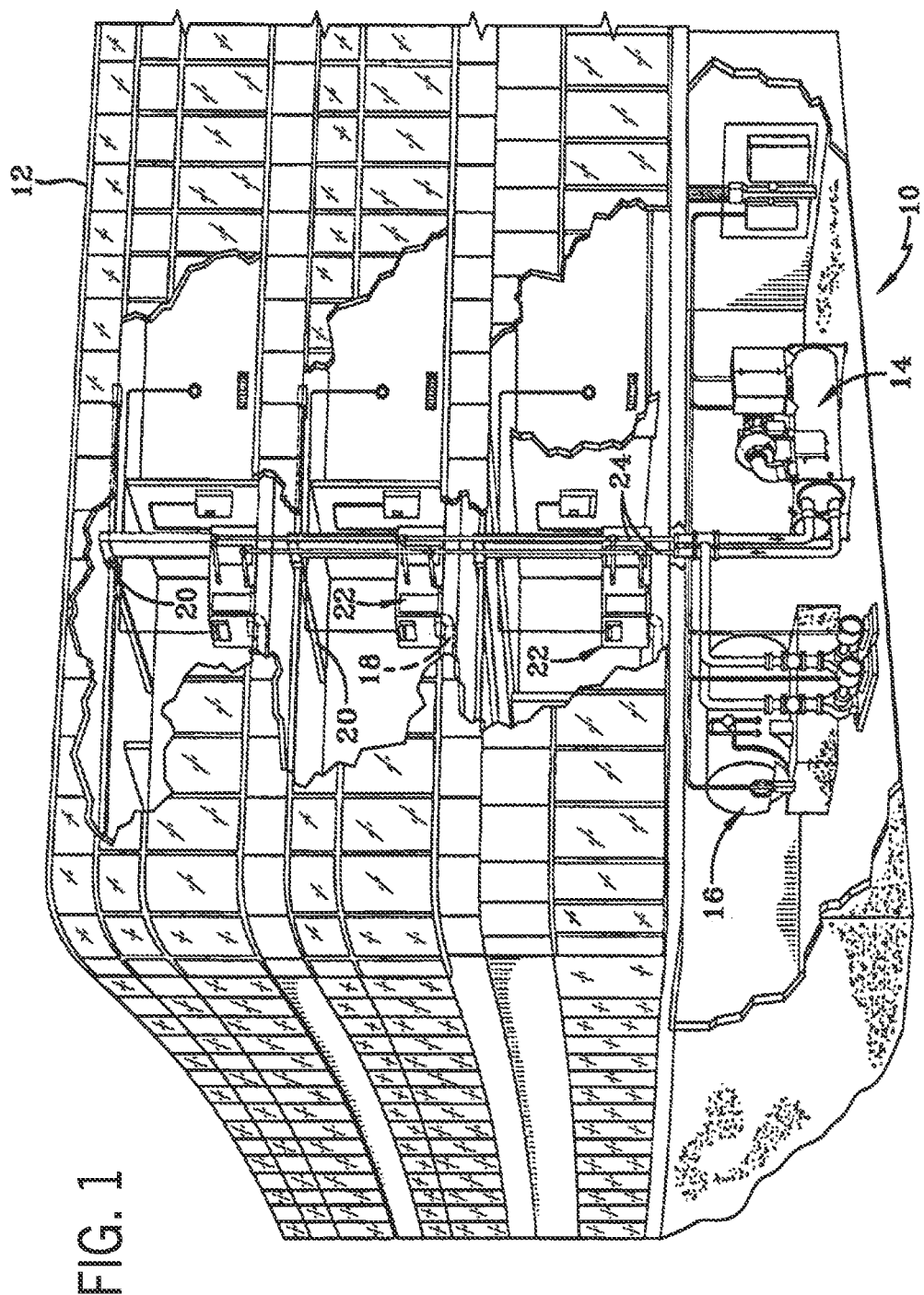
FIG. 1 is a perspective view of an embodiment of a building that may utilize a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
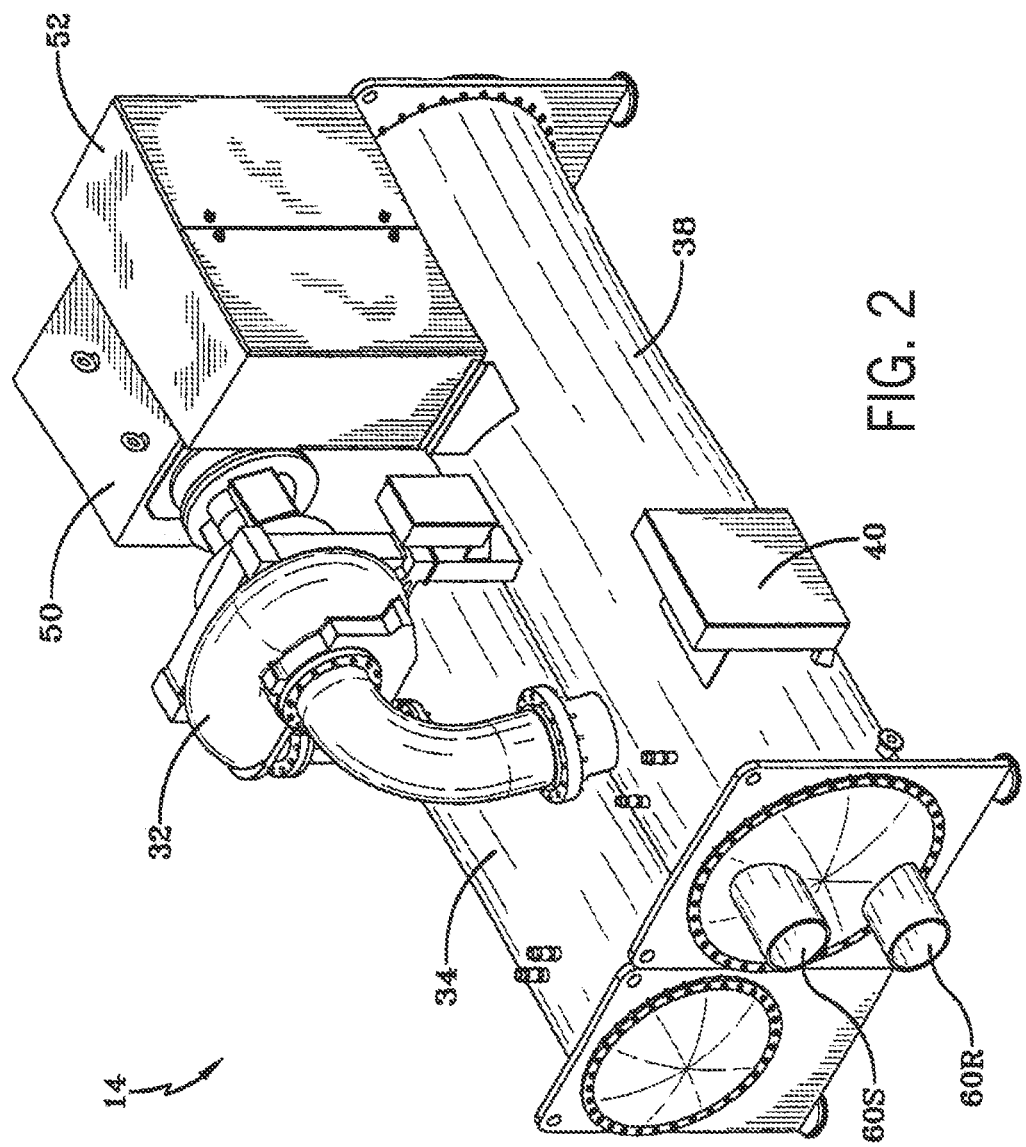
FIG. 2 is a perspective view of a vapor compression system, in accordance with an aspect of the present disclosure.
Figure 3:
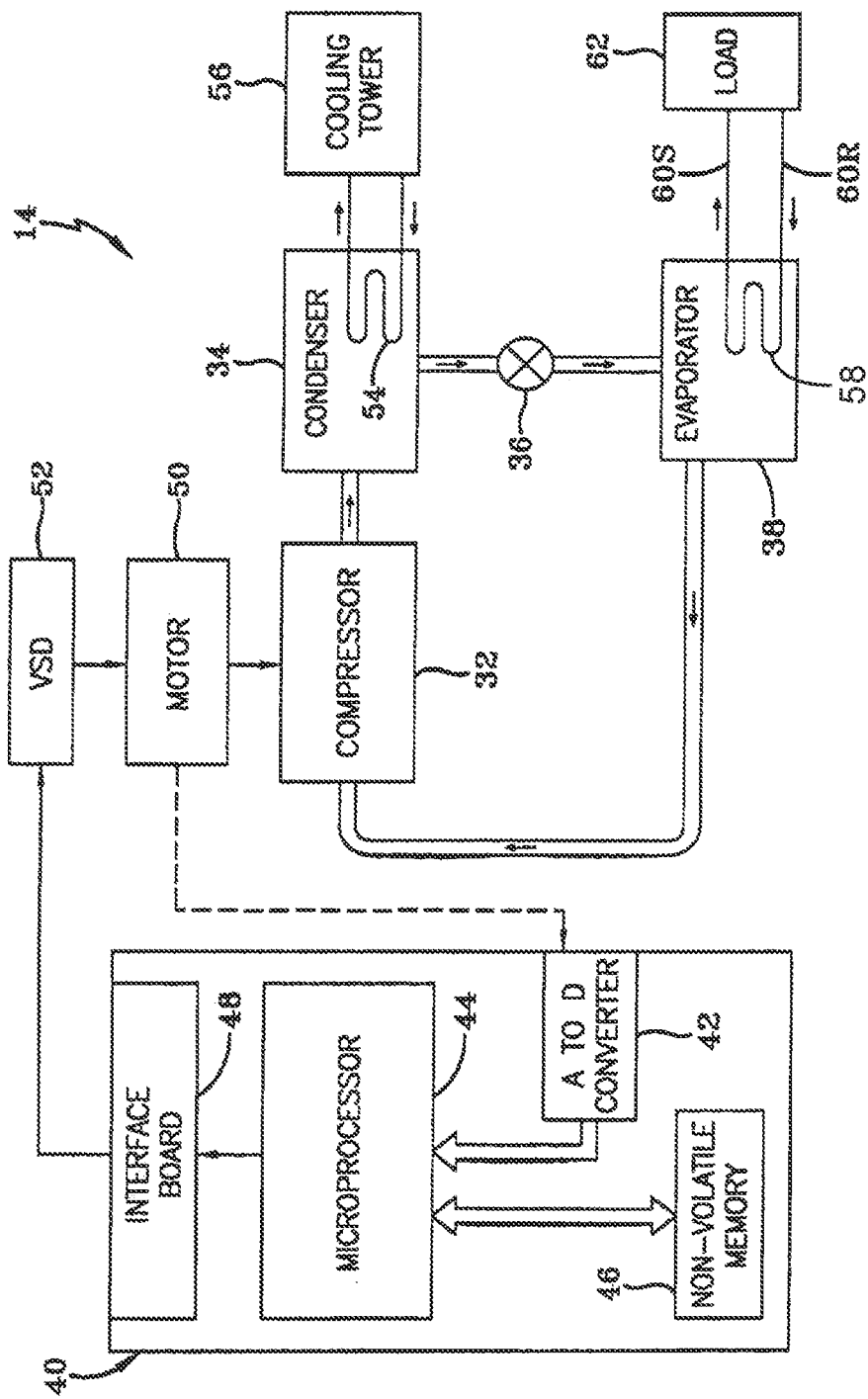
FIG. 3 is a schematic of an embodiment of the vapor compression system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
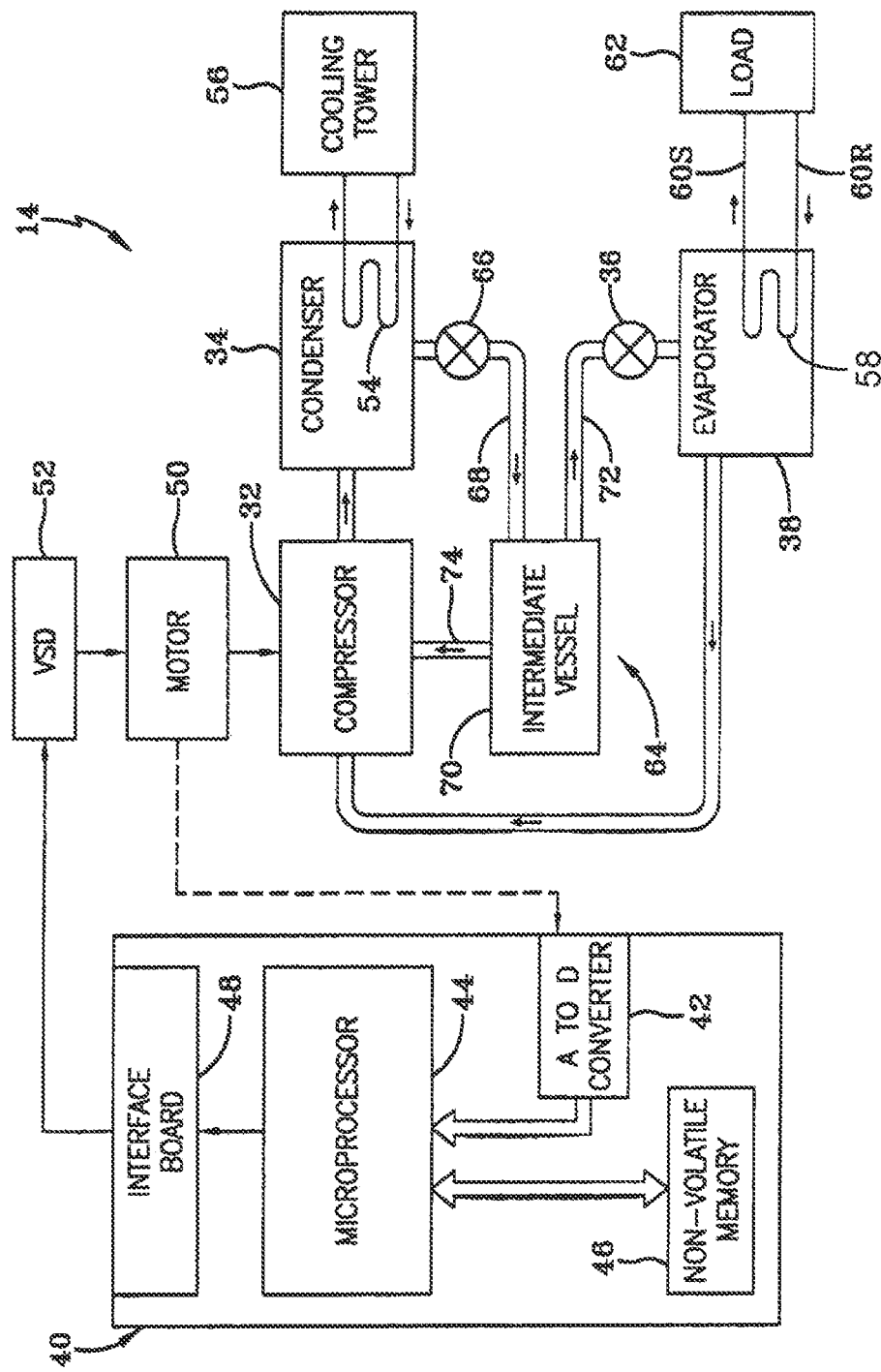
FIG. 4 is a schematic of an embodiment of the vapor compression system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

Figure 5:
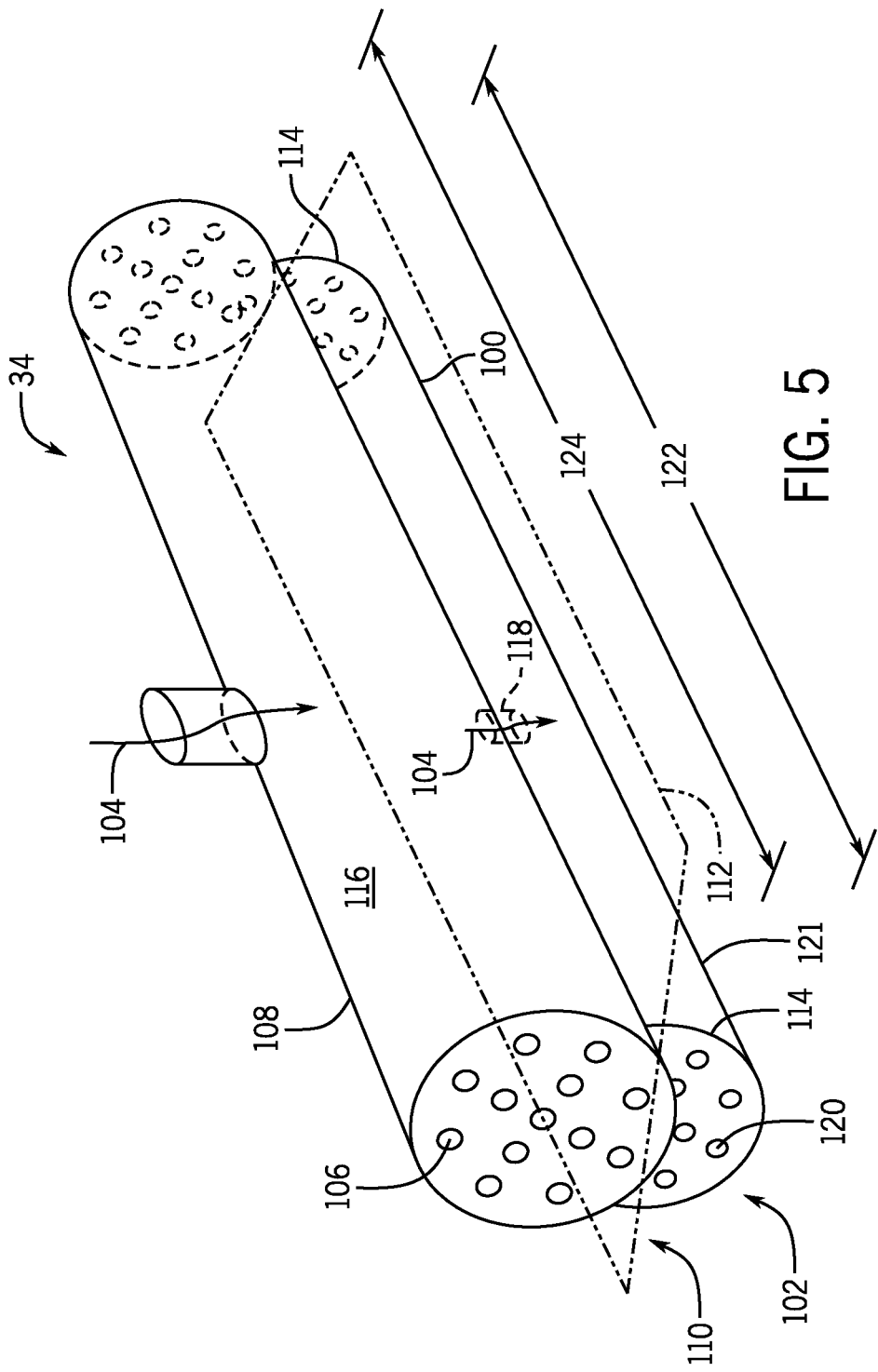
FIG. 5 is a perspective view of an embodiment of a condenser of the vapor compression system of FIG. 2 that includes an external subcooler having a shell portion, in accordance with an aspect of the present disclosure.

As discussed above, a condenser that includes an external subcooler may enhance an efficiency of the vapor compression system 14 and/or reduce costs of the vapor compression system 14. For example, FIG. 5 is a perspective view of the condenser 34 that includes an external subcooler 100. As shown in the illustrated embodiment of FIG. 5, the subcooler 100 may be a shell portion 102 (e.g., tube portion) that is configured to receive refrigerant 104 from a shell 108 of the condenser 34, where the shell 108 includes tubes 106 configured to be place a cooling fluid in a heat exchange relationship with the refrigerant 104. The shell portion 102 may resemble a half pipe or a conduit that includes a semi-circular cross section. In other embodiments, the shell portion 102 may be any suitable portion of a tube or conduit formed by cutting the tube or conduit along an intersection 110 of the tube or conduit with a plane or substantially planar surface 112 that enables edges 114 of the shell portion 102 to be secured along an outer surface 116 (e.g., a circumference) of the shell 108 of the condenser 34 (e.g., via welding or another suitable technique that couples the shell portion 102 to the outer surface 116 of the shell 108). In other words, the subcooler 100 is positioned external to the shell 108 of the condenser 34.

Openings 118 formed in the shell 108 are positioned so as to be in fluid communication with and covered by the shell portion 102, such that the refrigerant 104 flows from the shell 108 into the shell portion 102. Cooling fluid flowing through tubes 120 extending through a shell 121 of the shell portion 102 may exchange thermal energy with the refrigerant 104 surrounding the tubes 120. In some embodiments, the cooling fluid flowing through the tubes 120 is the same as the cooling fluid flowing through the tubes 106 of the condenser 34 (e.g., water), but at a lower temperature than the cooling fluid flowing through the tubes 106 of the condenser 34. Accordingly, the tubes 120 of the shell portion 102 may supercool the refrigerant 104 and increase a cooling capacity of the system 14. Such an increase in system cooling capacity may be achieved while minimizing an amount of refrigerant used in the condenser 34. In some embodiments, a length 122 of the shell portion 102 can be substantially equal to a length 124 of the shell 108. However in other embodiments, the lengths 122 and 124 may be different from one another.

Figure 6:
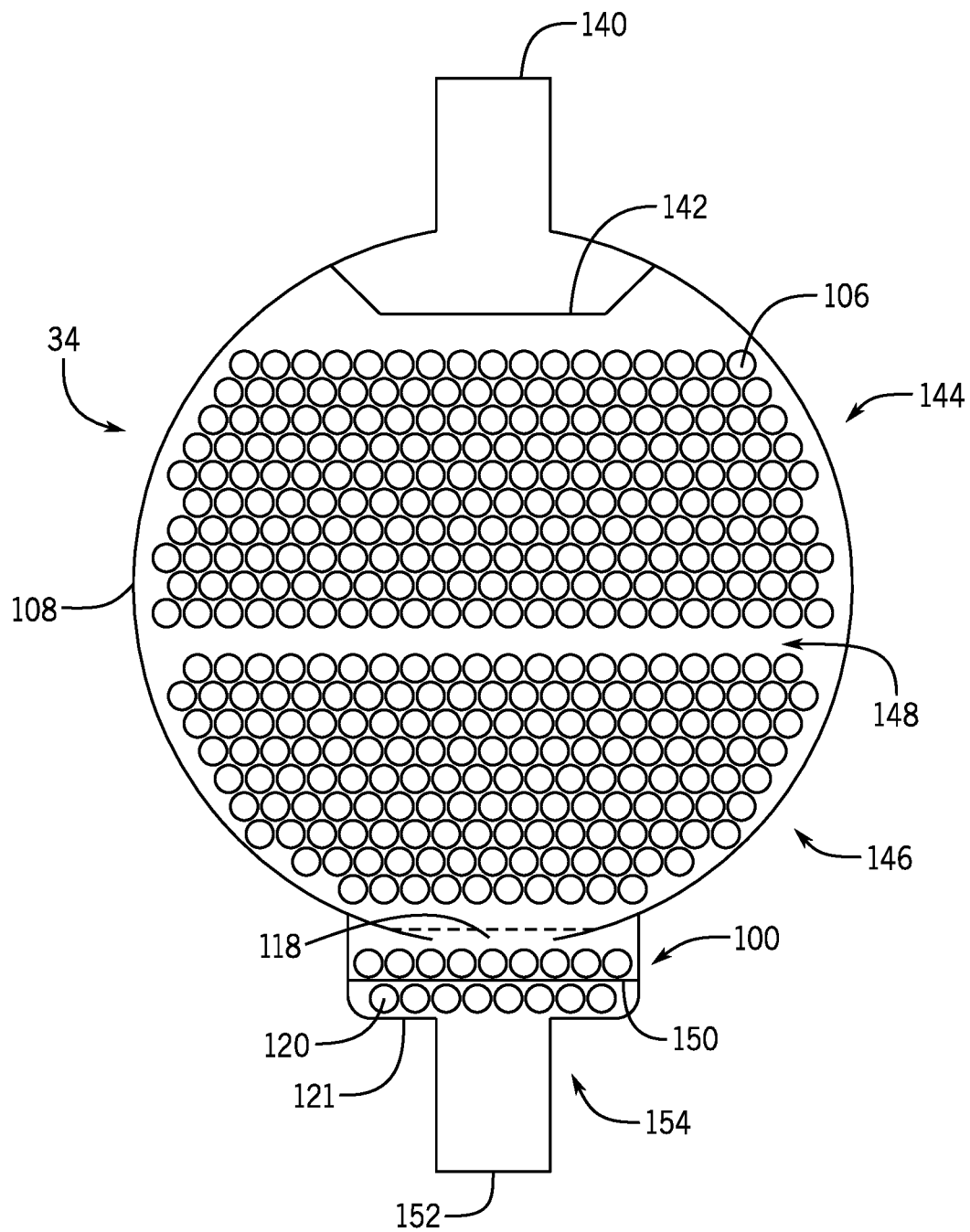
FIG. 6 is a cross section of an embodiment of the condenser having an external subcooler directly coupled to a shell of the condenser, in accordance with an aspect of the present disclosure.
Figure 7:
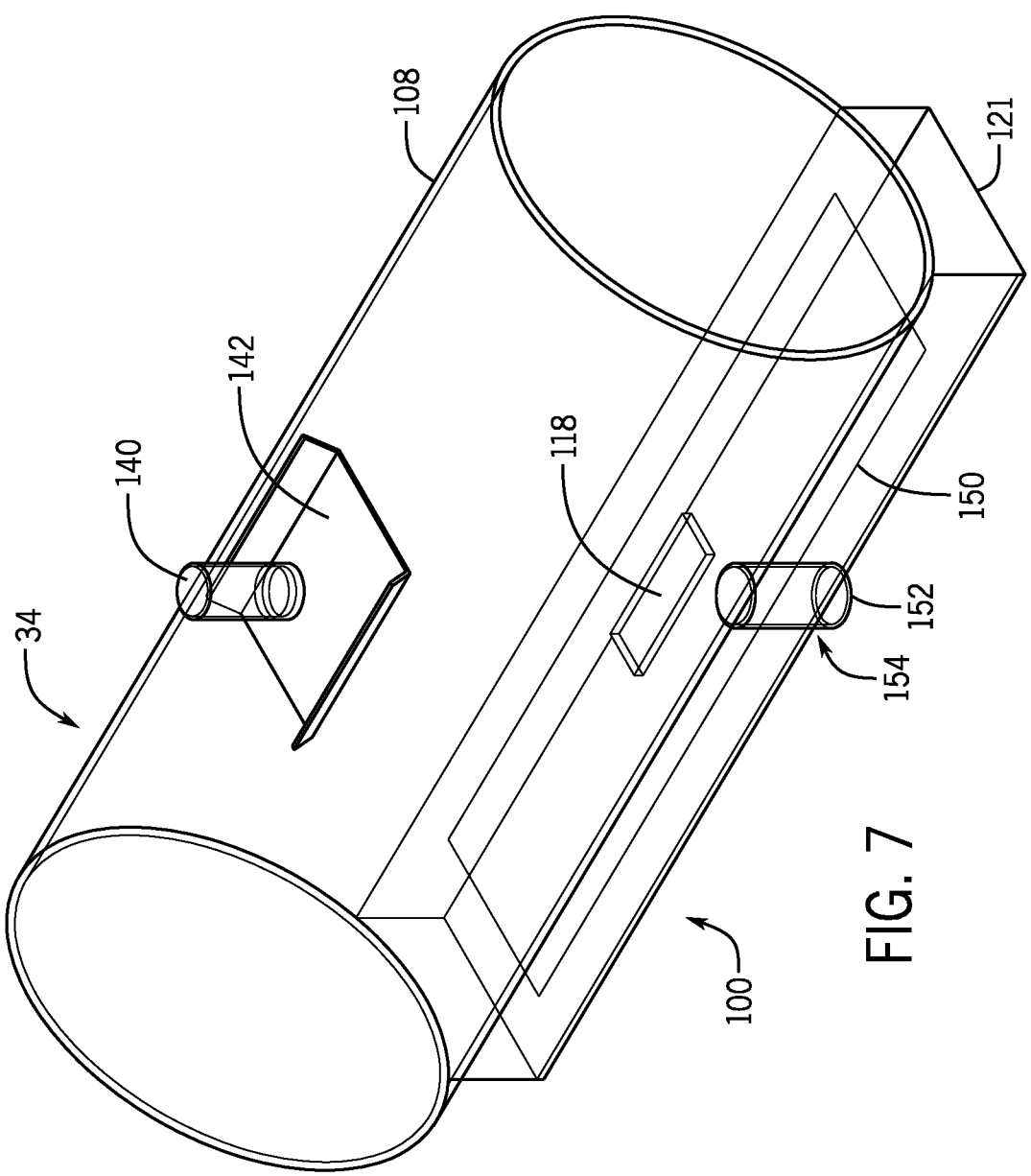
FIG. 7 is a perspective view of the condenser of FIG. 6, in accordance with an aspect of the present disclosure.

FIG. 6 is a cross section of an embodiment of the condenser 34 that includes the external subcooler 100, and FIG. 7 is a perspective view of the condenser 34 of FIG. 6. As shown in the illustrated embodiments of FIGS. 6 and 7, the subcooler 100 is external from the shell 108 of the condenser 34 and includes a substantially rectangular cross-section. The condenser 34 may include an inlet 140 that receives refrigerant (e.g., from the compressor 32) and directs the refrigerant into the shell 108 of the condenser 34. In some embodiments, the condenser 34 may include an impingement plate 142 that is configured to enhance distribution of the refrigerant over the tubes 106 of the condenser 34. As shown in the illustrated embodiments of FIGS. 6 and 7, the impingement plate 142 may be substantially aligned with the inlet 140. However, in other embodiments, the impingement plate 142 may be positioned in another suitable location within the shell 108 of the condenser 34. Additionally, the condenser 34 of FIGS. 6 and 7 has a first bundle 144 of the tubes 106 and a second bundle 146 of the tubes 106, where the first bundle 144 and the second bundle 146 are separated by a gap 148 that does not include any of the tubes 106. In some embodiments, separating the first bundle 144 and the second bundle 148 by the gap 148 may further enhance distribution of the refrigerant in the condenser 34 by enabling high pressure concentrations (e.g., pockets) of the refrigerant to be dispersed.

As shown in the illustrated embodiments of FIGS. 6 and 7, the shell 121 of the subcooler 100 is directly coupled to the shell 108 of the condenser 34. The shell 121 of the subcooler 100 is disposed over the opening 118 of the shell 108, such that refrigerant from the condenser 34 enters the subcooler 100 via the opening 118. The refrigerant entering the subcooler 100 may pass over the tubes 120, which may flow a cooling fluid that is at a lower temperature than a cooling fluid in the tubes 106 of the condenser 34. Accordingly, the refrigerant may be subcooled as thermal energy is transferred from the refrigerant to the cooling fluid in the tubes 120 as the refrigerant 26 passes over the tubes 120.

Figure 8:
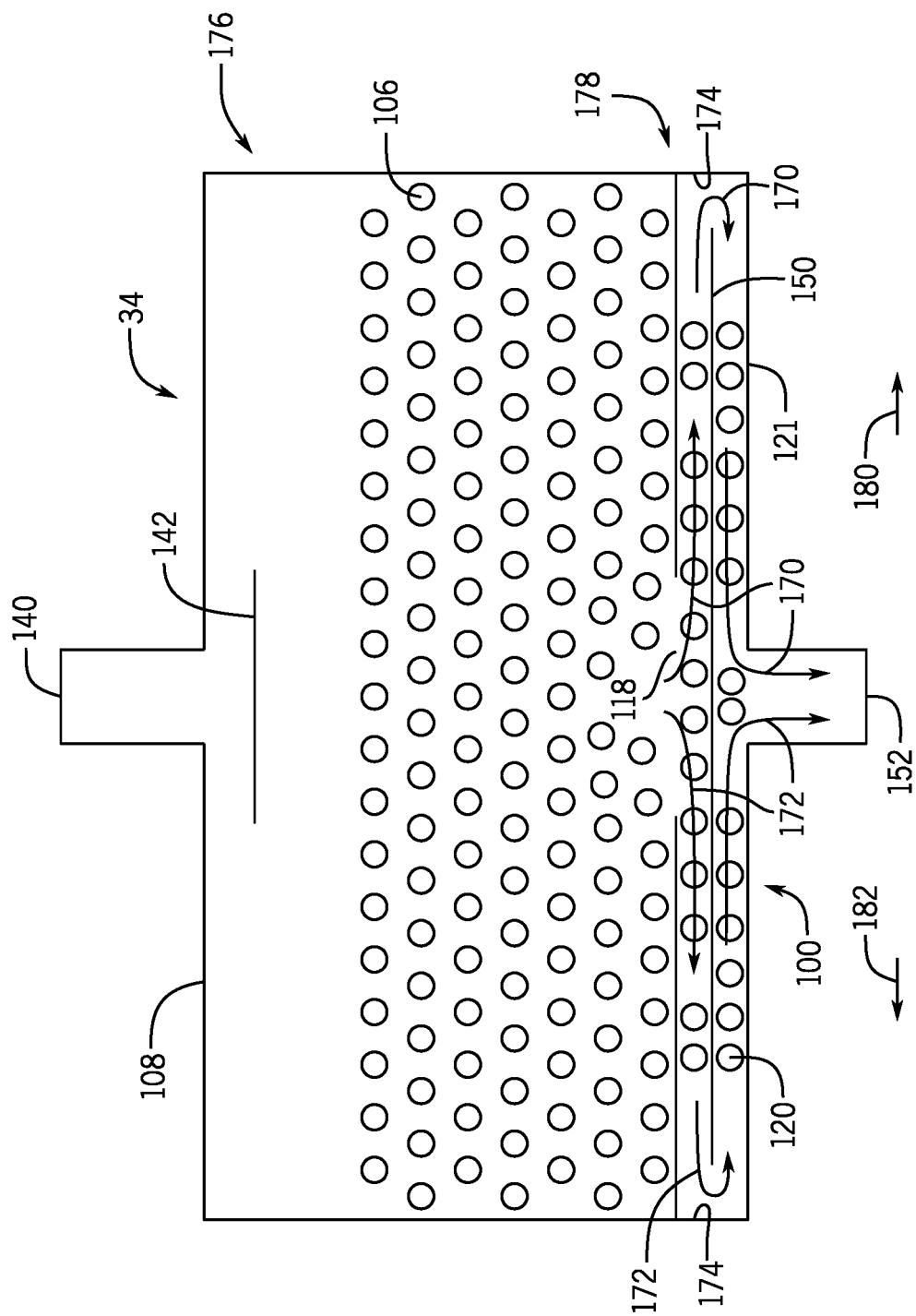
FIG. 8 is a cross section of an embodiment of the condenser of FIG. 6 with the external subcooler having a partition plate, in accordance with an aspect of the present disclosure.

In some embodiments, the subcooler 100 may include a partition plate 150 that separates the tubes 120 of the subcooler 100 to create two or more flow paths for the refrigerant within the subcooler 100 (see e.g., FIG. 8). Increasing an amount of flow paths for the refrigerant in the subcooler 100 may improve an efficiency of the subcooler 100 by exposing the refrigerant to more of the tubes 120. Regardless of the flow path in which the refrigerant takes through the subcooler 100, the refrigerant may ultimately exit the subcooler 100 through an outlet 152 that is connected to a bottom portion 154 of the subcooler shell 121.

FIG. 8 is a cross section of the condenser 34 that illustrates a first flow path 170 and a second flow path 172 of the refrigerant through the external subcooler 100 when the subcooler 100 includes the partition plate 150. For example, the partition plate 150 and an inner wall 174 of the subcooler shell 121 may act to direct the refrigerant along both the first flow path 170 and the second flow path 172. While the illustrated embodiment of FIG. 8 shows the subcooler 100 having two refrigerant flow paths, it should be noted that the subcooler 100 may have one refrigerant flow path or more than two refrigerant flow paths (e.g., three, four, five, six, seven, eight, nine, ten, or more refrigerant flow paths).

As shown in the illustrated embodiment of FIG. 8, the refrigerant enters the condenser 34 from the inlet 140, passes through the impingement plate 142, and exchanges heat with the tubes 106 of the condenser 34 to condense the refrigerant into a liquid (e.g., the refrigerant flows from a top 176 of the condenser 34 to a bottom 178 of the condenser 34 outside of the tubes 106). The liquid refrigerant may collect at the bottom 178 of the condenser 34 and enter the subcooler 100 through the opening 118. The refrigerant may be directed through the subcooler 100 along the first flow path 170 or the second flow path 172 from the opening 118 to the outlet 152 of the subcooler 100. As shown in the illustrated embodiment of FIG. 8, the refrigerant that flows along the first flow path 170 may be directed from the opening 118 toward the inner wall 174 in a first direction 180 and the refrigerant that flows along the second flow path 172 may be directed from the opening 118 toward the inner wall 174 in a second direction 182, opposite the first direction 180. Once the refrigerant reaches the inner wall 174, the refrigerant that flows along the first flow path 170 may be directed from the inner wall 174 to the outlet 152 in the second direction 182 and the refrigerant that flows along the second flow path 172 may be directed from the inner wall 174 to the outlet 152 in the first direction 180. Regardless of which flow path the refrigerant flows along, the refrigerant exchanges thermal energy with the cooling fluid in the tubes 120 of the subcooler 100 to reduce a temperature of the refrigerant and/or subcool the refrigerant. Directing the refrigerant along multiple flow paths may increase an amount of thermal energy transferred from the refrigerant by increasing an amount of the tubes 120 with which the refrigerant contacts.

It should be noted that the refrigerant does not substantially collect (e.g., pool) within the shell 108 of the condenser 34 in order to achieve subcooling when the subcooler 100 is external to the shell 108. Accordingly, substantially the same degree of subcooling may be achieved when the subcooler 100 is external to the shell 108 as compared to condenser configurations that include internal subcoolers. However, less refrigerant charge (e.g., collected refrigerant) may be present in embodiments having the external subcooler 100. Moreover, the external subcooler 100 may enable the condenser shell 108 to include the same number of tubes 106 as a condenser with an internal subcooler, but include a smaller diameter, thereby reducing costs. Further, because the external subcooler 100 may be separately manufactured from the condenser 34, manufacturing the condenser 34 may be less complex, time-consuming, and/or expensive.

Figure 9:
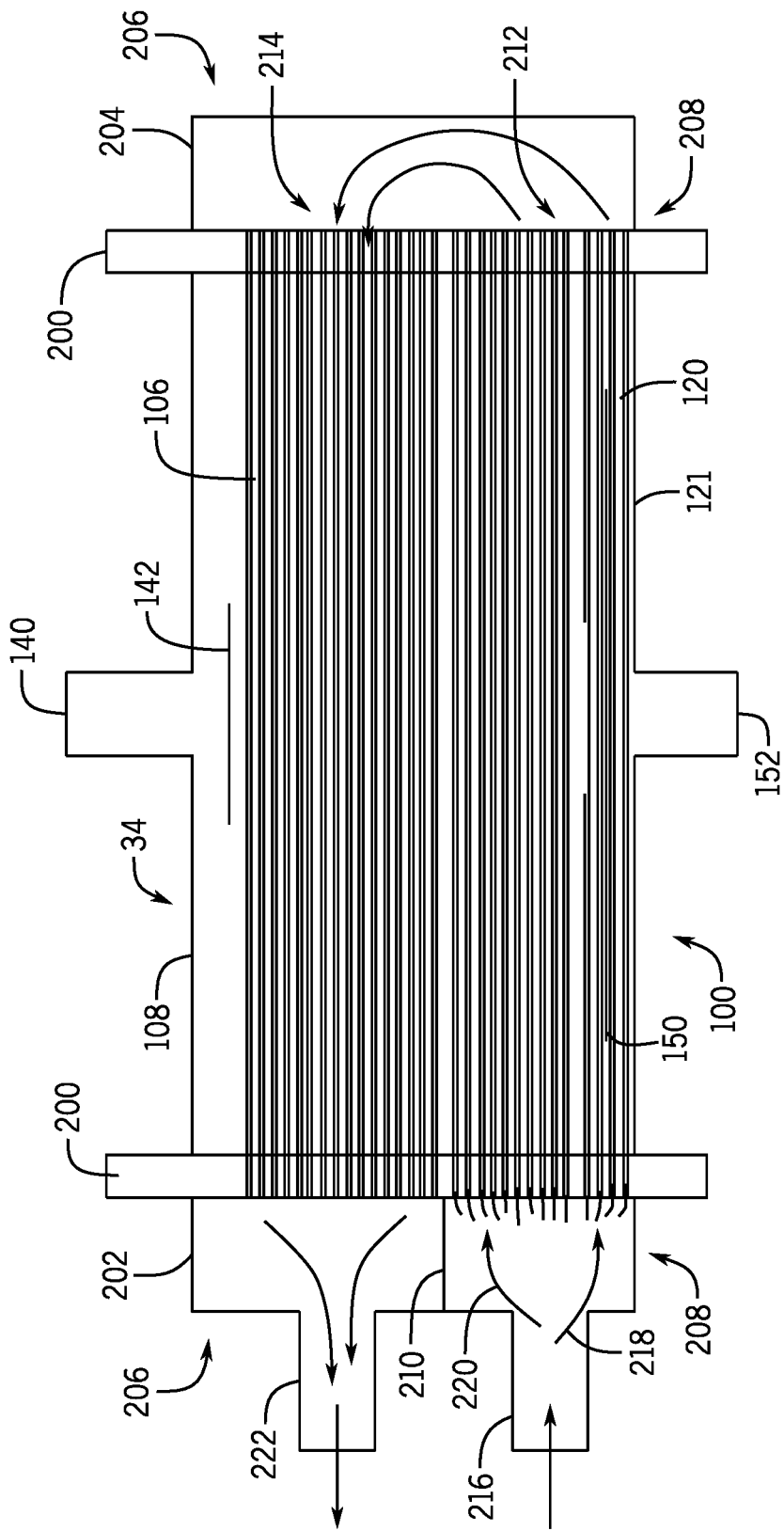
FIG. 9 is a cross section of an embodiment of the condenser that operates as a two-pass heat exchanger and includes the external subcooler, in accordance with an aspect of the present disclosure.

In some embodiments, the condenser 34 that includes the external subcooler 100 may be a dual-pass heat exchanger, which may further enhance an efficiency of the condenser 34. For example, FIG. 9 is a cross section of an embodiment of the condenser 34 that is configured to operate as a dual-pass heat exchanger. As shown in the illustrated embodiment of FIG. 9, the condenser 34 includes tube plates 200, a first water tank 202, and a second water tank 204 disposed at ends 206 of the condenser shell 108 and ends 208 the subcooler shell 121. The ends 208 of the subcooler shell 121 may be coupled to the tube plates 200 such that cooling fluid flowing through the tubes 120 of the subcooler 100 is blocked from leaking outside of the subcooler shell 121.

The condenser 34 may include a partition plate 210 that separates the tubes 106 of the condenser 34 into first pass tubes 212 and second pass tubes 214. As shown in the illustrated embodiment of FIG. 9, the first pass tubes 212 are disposed below the partition plate 210 with respect to the inlet 140 and the second pass tubes 214 are disposed above the partition plate 210 with respect to the inlet 140. The first pass tubes 212 may thus contact the refrigerant after the refrigerant has contacted the second pass tubes 214. Additionally, because the first pass tubes 212 may flow cooling fluid that is at a lower temperature than the second pass tubes 214, an efficiency of the condenser 34 may be enhanced.

Cooling fluid may enter the first water tank 202 from a cooling fluid inlet 216. A first portion 218 of the cooling fluid enters the subcooler 100 and a second portion 220 of the cooling fluid enters the first pass tubes 212 of the condenser 34. In some embodiments, the cooling fluid exiting both the tubes 120 of the subcooler 100 and the first pass tubes 212 may mix in the second water tank 204 before being directed into the second pass tubes 214. However, in other embodiments, the cooling fluid from the tubes 120 of the subcooler 100 may be directed to another location (e.g., back to the inlet 216). Upon exiting the first pass tubes 212, the cooling fluid may exit the condenser 34 via an outlet 222, which may direct the cooling fluid to a cooling tower or another suitable location.

In the embodiments of FIGS. 5-9, the condenser shell 108 and the subcooler shell 121 may be welded together. As such, the condenser 34 and the subcooler 100 may initially be two separate members, which may be manufactured respectively and connected together by conventional methods (e.g., welding), thus facilitating and/or simplifying manufacturing of the system 14.

Figure 10:
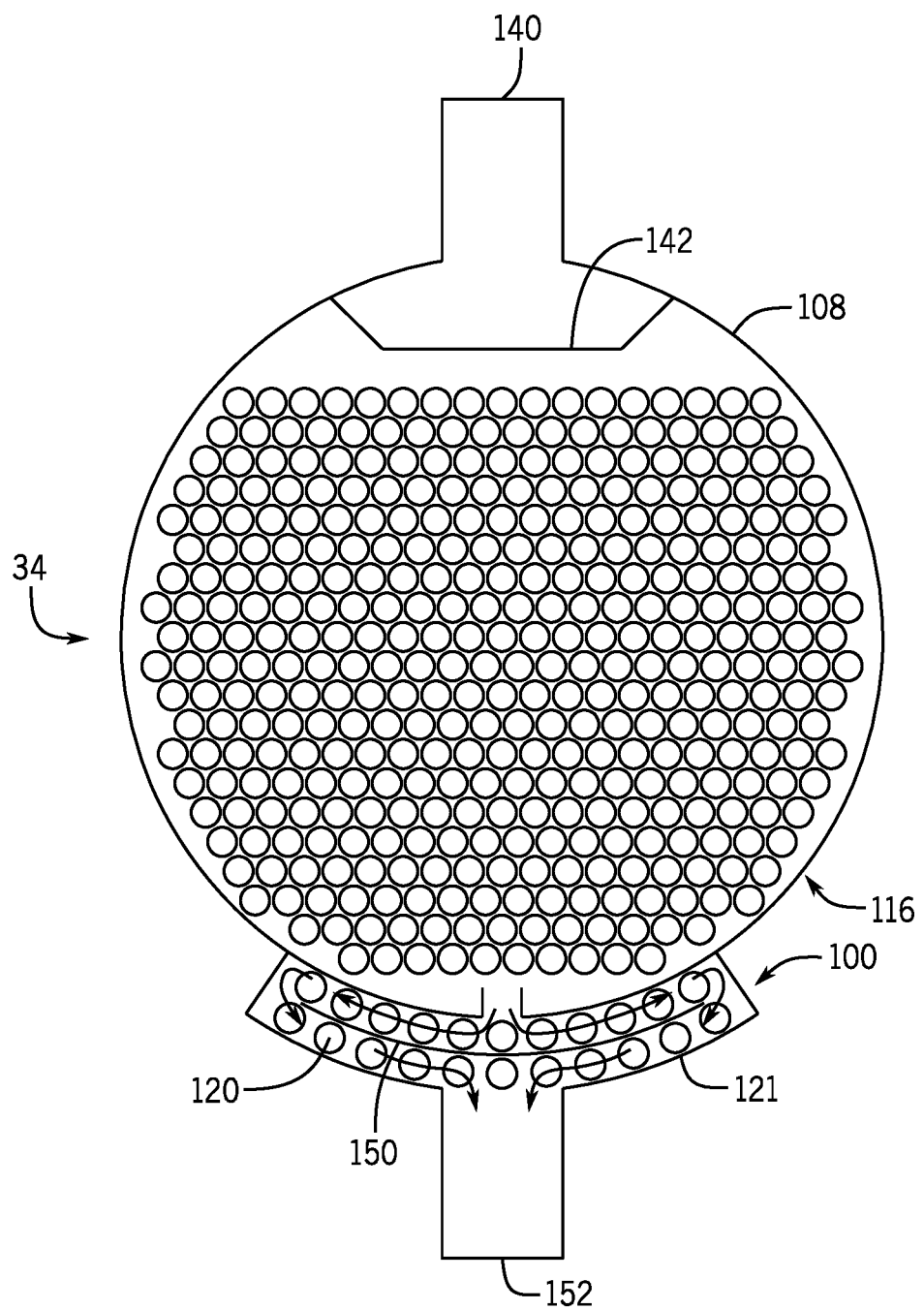
FIG. 10 is a cross section of an embodiment of the condenser that includes the external subcooler having a curved cross section, in accordance with an aspect of the present disclosure.

While the illustrated embodiments of the subcooler 100 of FIGS. 5-9 may include the shell portion 102 (i.e., FIG. 5) and/or a rectangular cross section (e.g., FIGS. 6-9), the subcooler 100 may include any other suitable shape. For example, FIG. 10 is a cross section of the condenser 34 having the subcooler 100 that is includes a curved cross section, such that the subcooler 100 conforms to the outer surface 116 of the condenser shell 108. Additionally, the subcooler 100 of FIG. 10 may include the partition plate 150, which may also include a curvature (e.g., an arc shape), such that the partition plate 150 mirrors a cross section of the subcooler 100. Additionally, the tubes 120 within the subcooler 100 may be arranged with the curvature of the subcooler 100 cross section. In some embodiments, the curved subcooler 100 of FIG. 10 may reduce a welding area between the subcooler shell 121 and the condenser shell 108, to further facilitate manufacturing.

Figure 11:
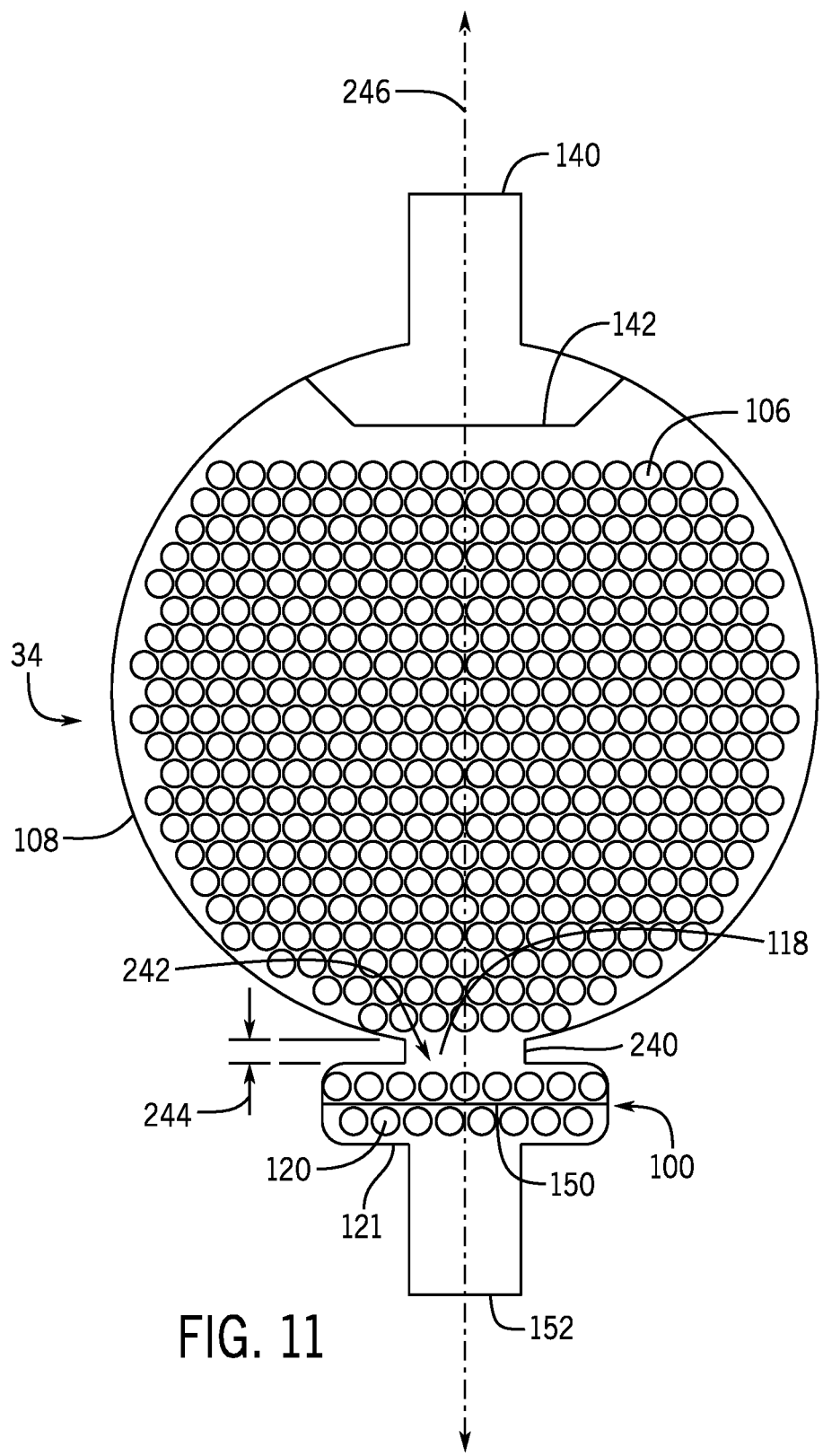
FIG. 11 is a cross section of an embodiment of the condenser that includes the external subcooler coupled indirectly to the shell of the condenser via an intermediate conduit, in accordance with an aspect of the present disclosure.

In still further embodiments, the subcooler 100 may be external to the condenser 34 and coupled to the condenser shell 108 without a direct weld or other abutment. For example, FIG. 11 is a cross section of an embodiment of the condenser 34 that includes the subcooler 100 coupled to the condenser shell 108 by an intermediate conduit 240 coupled to the opening 118 and an inlet 242 of the subcooler 100. Accordingly, a gap 244 is formed between the condenser shell 108 and the subcooler shell 121 by the intermediate conduit 240. Indeed, welds may ultimately couple the condenser shell 108 to the intermediate conduit 240 and the subcooler shell 121 to the intermediate conduit 240, but the condenser shell 108 and the subcooler shell 121 may not be directly welded to one another.

While the illustrated embodiment of FIG. 11 shows the condenser 34 having a single intermediate conduit 240, it should be recognized that more than one intermediate conduit 240 may be included to couple the condenser 34 to the subcooler 100 (e.g., two, three, four, five, six, seven, eight, nine, ten, or more intermediate conduits 240). Additionally, the intermediate conduit 240 of FIG. 11 is positioned along a central axis 246 of the condenser 34 (and/or the subcooler 100). However, in other embodiments, the intermediate conduit 240 may be positioned at any suitable location along the condenser shell 108 that sufficiently couples the condenser 34 to the subcooler 100. In some embodiments, the intermediate conduit 240 may be a cylindrical pipe. In other embodiments, the intermediate conduit 240 may include any suitably shaped conduit that directs refrigerant from the condenser 34 to the subcooler 100.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vapor compression system, comprising:
   a refrigerant loop;
   a condenser disposed along the refrigerant loop and configured to condense vapor refrigerant to generate liquid refrigerant, wherein the condenser comprises a first plurality of tubes, a first shell having a cylindrical shape in which the first plurality of tubes is disposed, and a refrigerant inlet coupled to the cylindrical shape of the first shell;
   a subcooler disposed along the refrigerant loop downstream from the condenser and configured to receive the liquid refrigerant from the condenser, wherein the subcooler comprises a second plurality of tubes and a second shell in which the second plurality of tubes is disposed, and wherein the second shell is separated from the first shell by a gap; and
   an intermediate conduit extending from the cylindrical shape of the first shell of the condenser to the second shell of the subcooler such that the intermediate conduit defines the gap, wherein the intermediate conduit is configured to pass the liquid refrigerant from the condenser to the subcooler, wherein the refrigerant inlet, the first shell, and the intermediate conduit are arranged such that a central axis extends through the refrigerant inlet, through a center point of the cylindrical shape of the first shell, and through the intermediate conduit, and wherein the intermediate conduit comprises a first width extending perpendicular to the central axis, the second shell comprises a second width extending perpendicular to the central axis, and the second width is greater than the first width.

2. The vapor compression system of claim 1, comprising an additional intermediate conduit extending from the cylindrical shape of the first shell to the second shell, wherein the additional intermediate conduit is configured to pass the liquid refrigerant from the condenser to the subcooler.

3. The vapor compression system of claim 1, wherein:
   the second plurality of tubes comprises a first group of tubes and a second group of tubes; and
   the subcooler comprises a partition plate disposed in the second shell, extending perpendicular to the central axis, and defining a first refrigerant flow path in which the first group of tubes is disposed and a second refrigerant flow path in which the second group of tubes is disposed.

4. A vapor compression system, comprising:
   a condenser configured to condense vapor refrigerant to generate liquid refrigerant, wherein the condenser comprises a refrigerant inlet, a first plurality of tubes, and a first shell having a cylindrical shape in which the first plurality of tubes is disposed and to which the refrigerant inlet is coupled;
   a subcooler configured to receive the liquid refrigerant from the condenser, wherein the subcooler comprises a second plurality of tubes and a second shell in which the second plurality of tubes is disposed; and
   an intermediate conduit extending from the cylindrical shape of the first shell to the second shell, wherein the intermediate conduit is configured to pass the liquid refrigerant from the condenser to the subcooler, wherein a central axis extends through the refrigerant inlet of the condenser, through a center point of the cylindrical shape of the first shell, and through the intermediate conduit, wherein the intermediate conduit comprises a first width extending perpendicular to the central axis, wherein the second shell comprises a second width extending perpendicular to the central axis, and wherein the second width is greater than the first width.

5. The vapor compression system of claim 4, comprising an additional intermediate conduit extending from the cylindrical shape of the first shell to the second shell, wherein the additional intermediate conduit is configured to pass the liquid refrigerant from the condenser to the subcooler.

6. The vapor compression system of claim 4, wherein the intermediate conduit comprises a second cylindrical shape defining a gap between the first shell and the second shell, and the gap does not include a heat exchange tube disposed therein.

7. The vapor compression system of claim 4, wherein:
   the second plurality of tubes comprises a first group of tubes and a second group of tubes; and
   the subcooler comprises a partition plate disposed in the second shell, extending perpendicular to the central axis, and defining a first refrigerant flow path in which the first group of tubes is disposed and a second refrigerant flow path in which the second group of tubes is disposed.

8. The vapor compression system of claim 4, wherein the subcooler comprises a refrigerant outlet coupled to the second shell, and the central axis extends through the refrigerant outlet.

9. A vapor compression system, comprising:
   a refrigerant loop;
   a compressor disposed along the refrigerant loop and configured to circulate refrigerant through the refrigerant loop;
   a condenser disposed downstream of the compressor along the refrigerant loop and configured to condense vapor refrigerant to liquid refrigerant, wherein the condenser comprises a first shell having a cylindrical shape, the cylindrical shape comprising an external surface facing outwardly from the condenser;
   a subcooler having a second shell directly coupled to the external surface of the cylindrical shape of the first shell of the condenser such that the subcooler is external to the first shell of the condenser, wherein the second shell comprises a cavity that is configured to receive the liquid refrigerant from the condenser and to cool the liquid refrigerant, wherein the subcooler comprises a partition plate having a first surface and a second surface opposite the first surface, wherein the first surface is configured to direct a first flow of the liquid refrigerant in a first direction directly between the first surface and the external surface of the cylindrical shape of the first shell, wherein the first surface is configured to direct a second flow of the liquid refrigerant in a second direction opposite the first direction and directly between the first surface and the external surface of the cylindrical shape of the first shell, wherein the second surface is configured to direct the first flow of the liquid refrigerant in the second direction directly between the second surface and an internal surface of the second shell, and wherein the second surface is configured to direct the second flow of the liquid refrigerant in the first direction directly between the second surface and the internal surface of the second shell; and an evaporator comprising a third shell disposed downstream of the subcooler along the refrigerant loop and configured to evaporate the liquid refrigerant into the vapor refrigerant, wherein the first shell, the second shell, and the third shell are independent of one another, such that the third shell does not enclose the first shell and the second shell.

10. The vapor compression system of claim 9, wherein a plurality of tubes configured to flow a cooling fluid are disposed within the second shell.

11. The vapor compression system of claim 9, wherein a plurality of tubes configured to flow a cooling fluid are disposed within the second shell.

12. The vapor compression system of claim 9, wherein the second shell includes a curved cross section conforming to the first shell of the condenser.

13. The vapor compression system of claim 9, wherein the subcooler comprises a partition plate configured to direct the refrigerant entering the subcooler along a first flow path and a second flow path.

14. The vapor compression system of claim 9, wherein the condenser is a dual pass heat exchanger comprising a partition plate, wherein the condenser comprises a first water tank configured to direct cooling fluid into first pass tubes of the condenser and subcooler tubes of the subcooler and a second water tank configured to direct cooling fluid exiting the first pass tubes and the subcooler tubes of the subcooler into second pass tubes of the condenser.

15. The vapor compression system of claim 14, wherein the first water tank is configured to direct the cooling fluid from the second pass tubes out of the condenser.

16. The vapor compression system of claim 9, wherein the partition plate comprises a curvature, and wherein the partition plate has a same radius of curvature as the first shell of the condenser.

* * * * *